United States Patent
Wuthnow et al.

(10) Patent No.: US 7,272,393 B1
(45) Date of Patent: Sep. 18, 2007

(54) LOCATION-BASED SERVICES FOR A MULTI-TECHNOLOGY WIRELESS DEVICE OPERATING IN A FOREIGN TECHNOLOGY MODE

(75) Inventors: Mark Steven Wuthnow, Austin, TX (US); Brian Keith Rainer, Lawrenceville, GA (US); Simon James Richardson, Pflugerville, TX (US)

(73) Assignee: Cingular Wireless II, LLC, Atlanta, GA (US)

( * ) Notice: Subject to any disclaimer, the term of this patent is extended or adjusted under 35 U.S.C. 154(b) by 391 days.

(21) Appl. No.: 10/801,048

(22) Filed: Mar. 15, 2004

Related U.S. Application Data

(60) Provisional application No. 60/455,691, filed on Mar. 18, 2003.

(51) Int. Cl.
*H04Q 7/20* (2006.01)
(52) U.S. Cl. .............................. 455/432.1; 455/456.1; 455/433
(58) Field of Classification Search ............. 455/432.1, 455/456.1, 433
See application file for complete search history.

(56) References Cited

U.S. PATENT DOCUMENTS

| | | | |
|---|---|---|---|
| 6,477,372 B1 | 11/2002 | Otting et al. | |
| 6,591,098 B1 | 7/2003 | Shieh et al. | |
| 6,603,977 B1 | 8/2003 | Walsh et al. | |
| 6,611,687 B1 | 8/2003 | Clark et al. | |
| 6,650,902 B1 | 11/2003 | Richton | |
| 6,795,425 B1 * | 9/2004 | Raith | 370/345 |
| 2001/0003093 A1 * | 6/2001 | Lundin | 455/456 |
| 2002/0094811 A1 | 7/2002 | Bright et al. | |
| 2002/0132636 A1 | 9/2002 | Stockhusen | |
| 2003/0109248 A1 | 6/2003 | Lewis | |
| 2003/0148774 A1 * | 8/2003 | Naghian et al. | 455/456 |
| 2003/0186676 A1 | 10/2003 | Ogman et al. | |
| 2003/0222819 A1 | 12/2003 | Karr et al. | |
| 2004/0137900 A1 * | 7/2004 | Varonen et al. | 455/433 |
| 2005/0014500 A1 * | 1/2005 | Muhonen et al. | 455/433 |

OTHER PUBLICATIONS

Anderson, Christoffer, Mobile Positioning—Where You Want To Be!, Wireless Developer Network web site, downloaded at http://www.wirelessdevnet.com/channels/lbs/features/mobilepositioning.html on Dec. 9, 2003.

(Continued)

*Primary Examiner*—Lester G. Kincaid
*Assistant Examiner*—Marisol Figueroa
(74) *Attorney, Agent, or Firm*—Gardner Groff Santos & Greenwald PC

(57) ABSTRACT

An existing network conversion element built to an existing standard is used to obtain the information needed to perform location-based services for a multi-technology wireless device operating in a foreign technology mode. A system includes a database relating temporary dialable numbers with corresponding equipment serving those numbers and a mobile position server in communication with the database. The mobile position server is operative to request and receive a temporary dialable number for a multi-technology wireless device operating in a foreign technology mode, utilize the database to obtain the identity of the equipment serving the wireless device from the temporary dialable number, and initiate appropriate location signaling to the serving equipment. Also, a method includes utilizing the temporary dialable number to determine the identity of the equipment serving the wireless device and obtaining the location of the device directly from the serving equipment.

14 Claims, 7 Drawing Sheets

OTHER PUBLICATIONS

Mind Commerce Training and Consulting, Mobile Positioning in GSM Networks, training course material, 2002, available on Mind Commerce web site at http://www.mindcommerce.com/Services/training/Courses/Mobile_Positioning_in_GSM_Networks.pdf, no month listed.

Mobile Lifestreams Limited, An Introduction to Mobile Positioning, white paper downloaded at http://ebmx.com/wp/positioning.htm on Dec. 9,2003.

Mobilein.com, Mobile Positioning Mobile in a Minute, white paper, Feb. 2001, downloaded at http://www.mobilein.com/mobile_positioning.htm on Dec. 19, 2003.

Hewlett-Packard Company, OpenCall mobile positioning center (MPC), web page, downloaded at http://h71028.www7.hp.com/enterprise/cache/4753-0-0-0-121.aspx, on Dec. 9,2003.

Mapinfo Corporation, E911 and Mobile Location Services, web page, 2003, downloaded at http://www.mapinfo.com/industries/mobile/e911_mls.cfm on Dec. 9,2003.

* cited by examiner

LOCATION-BASED SERVICES FOR A MULTI-TECHNOLOGY WIRELESS DEVICE OPERATING IN A FOREIGN TECHNOLOGY MODE

CROSS-REFERENCE TO RELATED APPLICATIONS

This application claims the benefit of U.S. Provisional Patent Application No. 60/455,691, filed Mar. 18, 2003, which is entirely incorporated herein by reference.

BACKGROUND OF THE INVENTION

1. Field of Invention

This invention relates to location-based services for multi-technology wireless devices. More particularly, the invention relates to a system and method for determining the location of a multi-technology wireless device when that device is operating in a foreign technology mode.

2. Description of Related Art

Various wireless technologies have been developed and implemented by wireless telephone carriers within and between different geographic locations around the globe. Examples of such wireless technologies include: Global System for Mobile Communications (GSM), Time Division Multiple Access (TDMA) (also ANSI-136), Code Division Multiple Access (CDMA), Personal Communication Services (PCS), General Packet Radio Service (GPRS), Enhanced Data for GSM Evolution (EDGE), and newer, third generation (3G) mobile systems currently under development. Additional wireless technologies have been developed for other applications such as computer networking (ie. Wi-Fi (IEEE 802.11) and Bluetooth). Each wireless technology type differs in such aspects as protocols, modulation techniques and system/subsystem architecture, thus making the equipment for each technology substantially incompatible with the equipment for the other technologies. Therefore, the various wireless technology types have created an obstacle preventing the wireless customer from being able to travel, or roam, between areas with different technology types, or take advantage of alternative technologies in an area having multiple technology types.

For these reasons, wireless equipment manufacturers have developed wireless devices capable of operating in multiple technology modes. Additionally, network conversion elements have been developed in order to enable such cross-technology wireless device operation. These multi-technology wireless devices can operate in both a home technology (native) mode or in one or more alternative technology (foreign) modes. When operating in a foreign mode, the network conversion element translates the signaling for a limited number of functions from the native technology protocol to the foreign technology protocol, consequently enabling the wireless device to access to those limited functions while operating in the foreign mode.

One example of such multi-technology wireless devices is that of GAIT mobile phones, or terminals, which are named after the standards body (GSM ANSI-136 Interoperability Team) which created the interoperability protocol. GAIT terminals are capable of operation in either GSM technology mode or ANSI-136 (TDMA) technology mode. This multi-technology operation is enabled by a network conversion element known as the Interworking and Interoperability Function (IIF) element, which enables limited mapping of functions between the GSM and ANSI-136 protocols.

For instance, the IIF element provides emulation of the requisite elements required for intra-technology roaming to the respective inter-technology components in order to provide for inter-technology call delivery. Thus, the IIF element emulates a native mode serving Mobile Switching Center (MSC) to the native mode Home Location Register (HLR), and it emulates a foreign mode HLR to the foreign mode serving MSC.

Location-based services are personalized services which are based on the location of a wireless device. Using various techniques wireless service providers are able to determine where, geographically, the wireless device is located. Examples of such services include roadside assistance, wireless device tracking, direction services to nearby attractions, traffic information, event information, and even location based targeted advertising, among others. These location-based services for wireless devices are value-added services in the wireless industry.

For example, in a typical location-based service for a wireless telephone, a location application (such as an application for the services described above) will query a mobile position server (MPS) for the location of a particular wireless telephone. The mobile position server then queries the HLR of the wireless telephone for the identity of the MSC that is serving the wireless telephone. Having the identity of the serving MSC, the mobile position server can then initiate the appropriate location signaling to equipment serving the wireless telephone in order to determine the location of the wireless phone. There are several positioning technologies that may be used, depending on the level of positioning accuracy needed by the application. The mobile position server then returns the location information for the wireless telephone to the application.

Therefore, the location-based service for a wireless telephone requires the mobile position server to obtain the identity of the serving MSC in order to initiate the requisite location signaling. However, in the case of a multi-technology wireless telephone that is operating in a foreign technology mode, such as a GAIT mobile phone as described above, the HLR contains only the identity of the network conversion element (which emulates the serving MSC). As a result, the typical location-based service for a wireless telephone is unable to obtain the identity of the actual serving MSC, and, therefore, is unable to initiate the requisite location signaling.

This problem would be common to any multi-technology wireless device operating in a foreign technology mode where standards and equipment have not been developed for mapping location-based service functionality between the technologies. A potential solution to this problem would be to develop standards and equipment for mapping location-based service functionality between whatever technologies the multi-technology system uses. However, this solution is undesirable because developing standards and equipment for mapping such functions is a lengthy and expensive process, and because the process would have to be repeated for each multi-technology system developed.

Thus, there is a need for a method of determining the location of a multi-technology wireless device operating in a foreign technology mode, without developing new standards and equipment for each multi-technology system developed.

There is also a need for a method of determining the identity of equipment serving a multi-technology wireless device operating in a foreign technology mode.

There is still further a need for a method of formatting an appropriate signaling message to obtain location information for a multi-technology wireless device operating in a foreign technology mode.

Further, there is a need for a method of identifying the type of technology in which a multi-technology wireless device is operating.

Even further, there is a need for a system for providing location-based services to a multi-technology wireless devices operating in a foreign technology mode.

Still further, there is a need for a computer-readable medium having computer-executable instructions for performing a method for determining the location of a multi-technology wireless device operating in a foreign technology mode.

SUMMARY OF THE INVENTION

The present invention meets these needs, and others, by providing a system and method for determining the location of a multi-technology wireless device, when that device is operating in a foreign technology mode, which substantially utilizes the standards and equipment for inter-technology call delivery and intra-technology location-based services. The invention utilizes an existing network conversion element built to an existing standard to obtain the information needed to perform location services in a cross-technology environment. Accordingly, no new standards or equipment for mapping location-based service functionality between technologies is needed and no time or expense need be spent in developing and implementing such standards and equipment.

Additionally, the method of the invention determines the identity of the equipment serving a multi-technology wireless device operating in a foreign technology mode, and also provides a way of formatting an appropriate signaling message to obtain such location information for such a multi-technology wireless device operation in a foreign technology mode. As a further benefit, even if location services are not involved, the method of the invention provides a way of identifying the type of technology in which a multi-technology wireless device is operating.

Generally described, the method of the invention utilizes a mobile position server, or the functional equivalent thereof, to request and receive a temporary dialable number for the multi-technology wireless device operating in a foreign technology mode. The mobile position server then determines the identity of the equipment serving the wireless device by utilizing the temporary dialable number. Once the identity of the serving equipment is known, the mobile position server can initiate appropriate location signaling to the serving equipment in order to determine the location of the wireless device.

More specifically, in requesting and receiving the temporary dialable number, the mobile position server may request the identity of the serving equipment from a native technology serving equipment subscriber database for the wireless device, which will provide the identity of a network conversion element in lieu of the identity of the actual serving equipment since the wireless device is operating in a foreign technology mode. Therefore, the mobile position server will be able to determine that the identity returned is that of the network conversion element and request the temporary dialable number for the wireless device from the network conversion element.

According to an aspect of the invention, a database relating temporary dialable numbers with the identity of the equipment serving those numbers may be available to the mobile position server. Thus, the mobile position server may utilize the temporary dialable number database to cross reference the temporary dialable number with the identity of the equipment serving the temporary dialable number.

According to another aspect of the invention, in initiating appropriate location signaling to the serving equipment, the mobile position server may determine the level of accuracy desired for the location information and format a request for the location of the wireless device that is appropriate to the desired accuracy and to the equipment that is serving the wireless device. Then, the mobile position server can send the location request directly to the serving equipment.

Generally described, the method of the invention may also be used to just determine the identity of the equipment serving a multi-technology wireless device operating in a foreign technology mode. The identity of the serving equipment could then be used in determining the location of the wireless device, or for any other purpose that for which the identity of the serving equipment might be useful. According to this aspect of the invention, the mobile position server, or its functional equipment, requests and receives a temporary dialable number for the wireless device. The mobile position server can then utilize a database relating temporary dialable numbers to the equipment serving those numbers, to cross reference the temporary dialable number to the equipment serving that number. In this aspect of the invention, more specifically, the mobile position server may request the identity of the serving equipment from a native technology serving equipment subscriber information database for the wireless device and determine that the subscriber information database has returned the identity of a network conversion element in lieu of the identity of the actual serving equipment. The mobile position server may then request the temporary dialable number from the network conversion element.

Also generally described, the method of the invention may be simply characterized as a way to initiate appropriate location signaling to equipment serving a multi-technology wireless device operating in a foreign mode, where a mobile position server requests and receives a temporary dialable number for the wireless device, and then determines the identity of the equipment serving the wireless device by utilizing the temporary dialable number. Once the mobile position server determines the identity of the serving equipment, it can format a request for the location of the wireless device appropriate to the identity of the serving equipment and send the request directly to the serving equipment.

The invention may also be used as a way to identify the type of technology in which a multi-technology wireless device is operating. In this aspect of the invention, generally, a mobile position server, or its functional equivalent, requests and receives a temporary dialable number for the multi-technology wireless device. The mobile position server then utilizes a database which relates temporary dialable numbers with the technology of equipment associated with the temporary dialable numbers to determine the technology of the serving equipment.

The invention generally includes a database relating temporary dialable numbers with the corresponding equipment serving the temporary dialable numbers, and a mobile position server in communication with the temporary dialable number database. The mobile position server is operative to request and receive a temporary dialable number for the multi-technology wireless device, and then utilize the database to cross reference the temporary dialable number with the identity of the equipment serving that number. Finally, having the identity of the equipment serving the wireless device, the mobile position server is operative to determine the location of the wireless device directly from the serving equipment.

According to an aspect of the system, the invention may also include a network conversion element that is operative to translate signaling from a native technology protocol to a foreign technology protocol, and a subscriber information database operating in the native technology environment of the wireless device. The subscriber information database would contain the address of the network conversion element associated with the wireless device when it is operating in a foreign technology environment. In this aspect of the invention, the mobile position server is in communication with the network conversion element and the subscriber information database, and the mobile position server is operative to determine that the subscriber information database contains the address of the network conversion element. Upon making this determination, the mobile position server can request and receive the temporary dialable number from the network conversion element.

In accordance with other aspects, the invention may also consist of one or more computer readable media having executable instructions for performing the various methods of the invention.

Additionally, it should be noted that the invention may generally be applied in any wireless environment, including wireless telephones, computers, PDAs and pagers, as well as application in wireless computer networks and any other wireless environments employing multi-technology wireless devices. As such, the term "wireless devices" should be broadly interpreted in conjunction herewith to include any device capable of communicating in any manner with other devices without being connected together by wires, cables, fibers, or the like.

Other features and advantages of the invention will be described in, or apparent from, the following detailed description of exemplary embodiments of the invention.

DETAILED DESCRIPTION OF EXEMPLARY EMBODIMENTS

A system or method in accordance with the present invention may serve various multi-technology wireless devices providing voice, data, video or any other content. Further, the technologies employed may utilize analog, digital or a combination of transmission methods utilizing any number of standards or protocols. Accordingly, the term multi-technology wireless device as used herein means any device that is capable of the wireless communication of any type of information content utilizing any transmission method and more than one standard or protocol.

The exemplary embodiments contained herein are for multi-technology wireless telephones, or more specifically, GAIT terminals. However, the principles taught herein will apply equally to other multi-technology wireless devices and related network elements. Therefore, unless otherwise noted, all references to wireless telephones, devices, systems and methods are intended to refer generally to all functionally equivalent devices, systems and methods.

Figure 1:
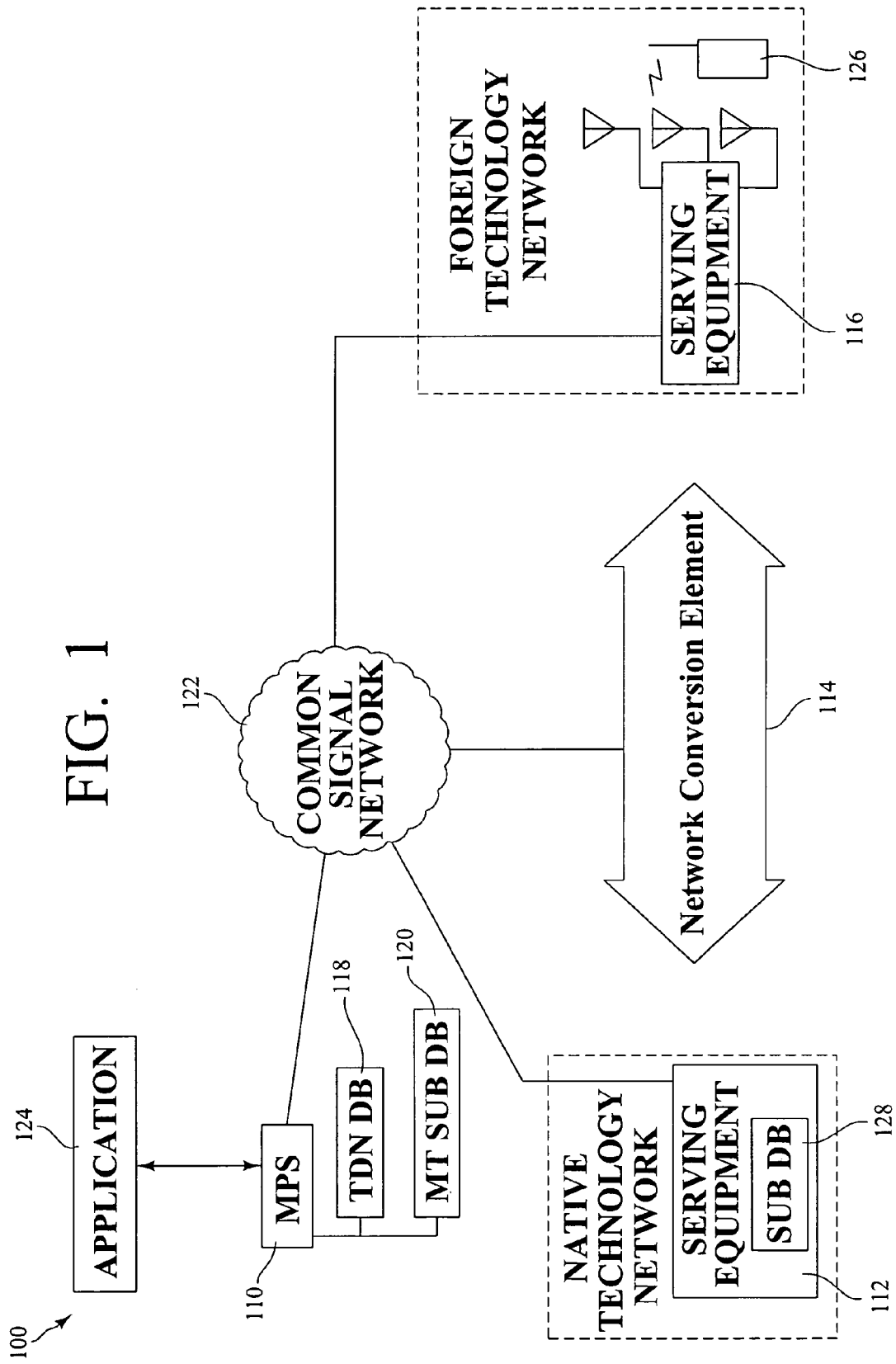
FIG. 1 is a block diagram of selected elements of a system for determining the location of a multi-technology wireless device operating in a foreign technology mode, according to an exemplary embodiment of the invention.

As shown in FIG. 1, an exemplary system 100 for determining the location of a multi-technology wireless device utilizes an apparatus generically referred to herein as a mobile position server (MPS) 110, which interacts with native technology serving equipment 112, a network conversion element 114, foreign technology serving equipment 116, and various database elements 118, 120 using a common signaling network 122.

The MPS 110 acts as an interface or gateway between a location application 124 and the wireless systems elements. Typically, the location application 124 and the MPS 110 communicate using an internet protocol, such as TCP/IP, and the MPS 110 communicates with the wireless systems elements over a common signaling network 122, such as Signaling System 7 (SS7). The MPS 110 provides the logic and the signaling capabilities to determine the location of a multi-technology wireless device 126 and deliver the location information to the location application 124.

The MPS 110 may be referred to by various titles or names in various protocols. For instance, in the ANSI-136 environment, the MPS is commonly called a Mobile Position Center (MPC); while in the GSM environment it is called a Gateway Mobile Location Center (GMLC).

The native technology serving equipment (NTSE) 112 provides a database (SUB DB) 128 containing subscriber information which is accessible by the MPS 110 through the common signaling network 122. The SUB DB 128 typically contains address information for the switching equipment that is actively serving the wireless device. However, in the case of a multi-technology wireless device operating in a foreign technology mode, the network conversion element 114 provides emulation of the serving equipment and the SUB DB 128, instead, contains address information for the network conversion element 114.

In a wireless telephone environment, the subscriber information database 128 is typically referred to as a Home Location Register (HLR).

The network conversion element (NCE) 114 translates the signaling for a limited number of functions from the native technology protocol to the foreign technology protocol. For basic foreign technology mode operation of a multi-technology wireless device 126, calls to the device must be rerouted from the native technology serving equipment 112 to the foreign technology serving equipment 116. The network conversion element 114 provides the signal translation required in order to reroute the call to the foreign technology serving equipment 116.

In a GAIT system, the network conversion element 114 is known as the Interworking and Interoperability Function element (IIF).

The foreign technology serving equipment (FTSE) 116 is the equipment that is actively serving the multi-technology wireless device 126. As such, the foreign technology serving equipment has active information regarding the physical "cell" in which the device 126 is located from the device signal strength and tower location. Further, the foreign technology serving equipment 116 may also have equipment generically referred to as location determining entity equipment which is capable of more precisely determining the location of the wireless device 126 by triangulation and other positioning technologies.

The location determining entity equipment (LDE) may be referred to by various titles in various protocols. For instance, in the ANSI-136 environment, the location determining entity equipment is commonly called a Position Determining Entity (PDE); while in the GSM environment it is called a Serving Mobile Location Center (SMLC). The protocols for communication with the location determining entity equipment vary by their technology environment. For this reason, compatible and appropriate location signaling for each technology environment is required for communication with the location determining entity equipment.

For basic foreign technology mode operation of a multi-technology wireless device 126, however, the foreign technology serving equipment 116 has temporary dialable numbers which can be temporarily assigned to the device 126 for rerouting calls from the native technology serving equipment 112 to the foreign technology serving equipment 116.

In a GAIT system, the temporary dialable numbers are called temporary location directory numbers (TLDNs) in the ANSI-136 environment and roaming numbers in the GSM environment.

The temporary dialable number database (TDN DB) 118 and the multi-technology subscriber information database (MT SUB DB) 120 are accessible by the MPS 110.

The TDN DB 118 is provisioned with information relating temporary dialable numbers to the corresponding equipment serving the temporary dialable numbers.

The MT SUB DB 120 is provisioned with information relating the subscriber numbers for each of the technologies. For instance, the MT SUB DB 120 for a GAIT system will relate the ANSI-136 Mobile Identification Number (MIN) to the GSM International Mobile Subscriber Identity (IMSI) for use by the mobile position center 110 in communication with the system elements.

Figure 2:
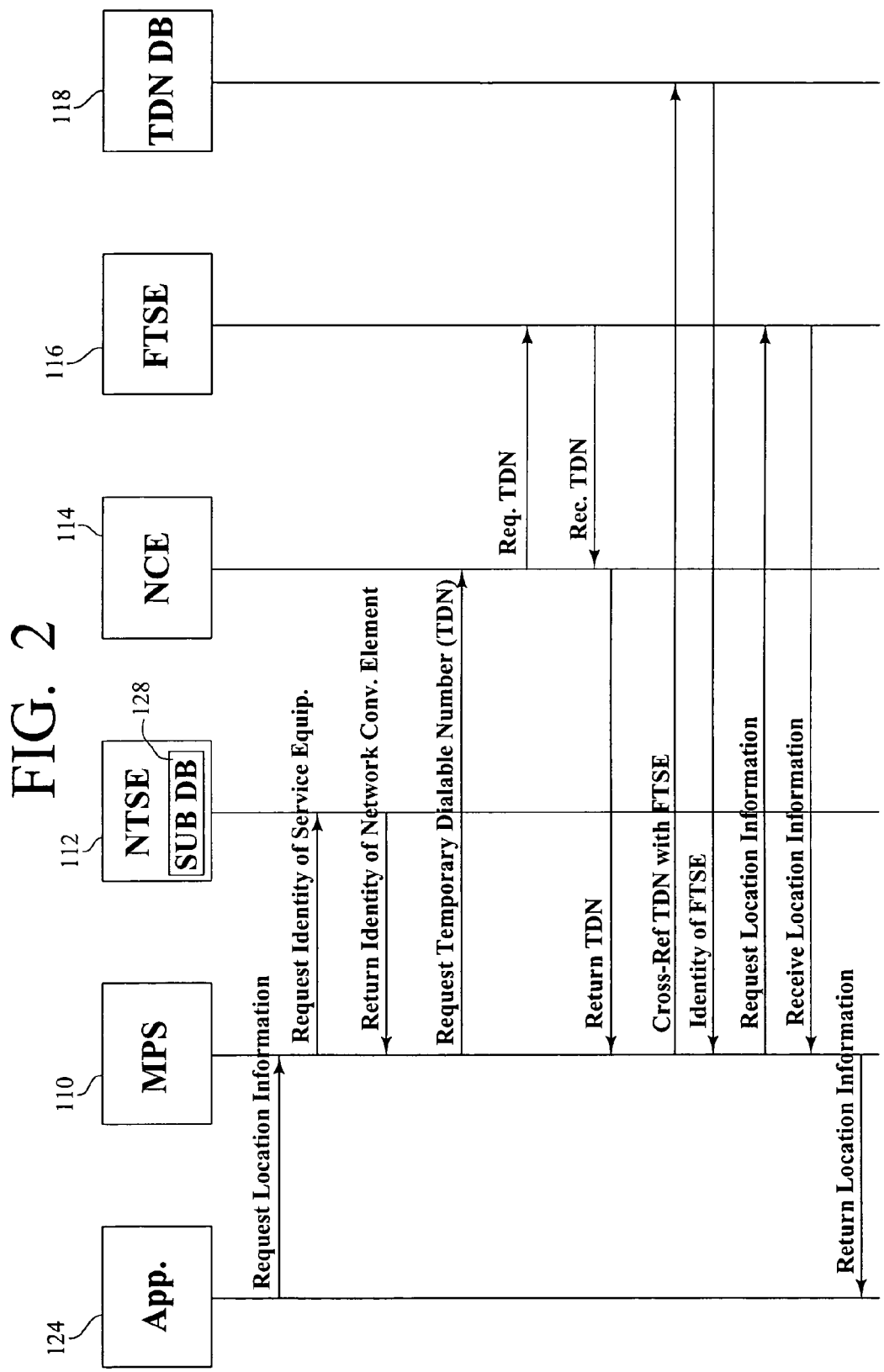
FIG. 2 is a message flow diagram depicting message generation and propagation steps for an exemplary embodiment of a method for determining the location of a multi-technology wireless device operating in a foreign technology mode.

Turning now to FIG. 2, an exemplary method for determining the location of a multi-technology wireless device operating in a foreign technology mode involves: Obtaining a temporary dialable number for the multi-technology wireless device, determining the identity of the equipment serving the wireless device by using the temporary dialable number, and initiating location signaling to the equipment serving the wireless device to determine the location of the wireless device.

More specifically, as shown in FIG. 2, the MPS 110 receives a request from an application 124 for location information for the wireless device.

The MPS 110 then obtains the temporary dialable number for the multi-technology wireless device by the following sequence: the MPS 110 requests the identity of the equipment serving the device from the subscriber database (SUB DB) 128 of the native technology serving equipment (NTSE) 112; the MPS receives a response from the SUB DB 128 and determines that the SUB DB 128 has provided the identity of a network conversion element (NCE) 114 instead of the identity of actual serving equipment; the MPS 110 then request a temporary dialable number (TDN) from the NCE 114; the NCE 114 requests and receives the TDN from the foreign technology serving equipment (FTSE) 116 using the foreign technology protocol; and then the NCE 114 returns the temporary dialable number to the MPS 110 in the native technology protocol. Thus, the elements for obtaining the TDN broadly includes the MPS 110, the SUB DB 128, the NCE 114, and the FTSE 116. The elements for obtaining the TDN are shown as separate elements. However, one will recognize that various equivalent configurations of the elements may be implemented in either hardware or software on one or more computers or other state machines without departing from the spirit or scope of the claimed invention.

Next, the MPS 110 determines the identity of the equipment serving the wireless device by utilizing the TDN. As discussed earlier, the TDN DB 118 acts to relate temporary dialable numbers for roaming devices in a wireless network with the corresponding equipment serving the temporary dialable numbers. As shown, the MPS 110 uses the temporary dialable number database (TDN DB) 118 to cross reference the TDN with the identity of the FTSE 116. Therefore, the MPS 110 and the TDN DB 118 work together to determine the identity of the equipment serving the wireless device. Again, the elements for determining the identity of the equipment serving the wireless device are shown as separate elements, but could be implemented either in hardware or software on one or more devices in equivalent configurations.

Next, having the identity of the FTSE 116, the MPS 110 determined the location of the wireless device directly from the FTSE 116. Determining the location of the wireless device involves the MPS 110 formatting a request which provides the desired accuracy and is compatible with the technology and the protocol of the FTSE 116, sending that request to the FTSE 116, and receiving the location information from the FTSE 116.

Finally, the MPS 110 returns the location information for the wireless device to the application 124.

Figure 3:
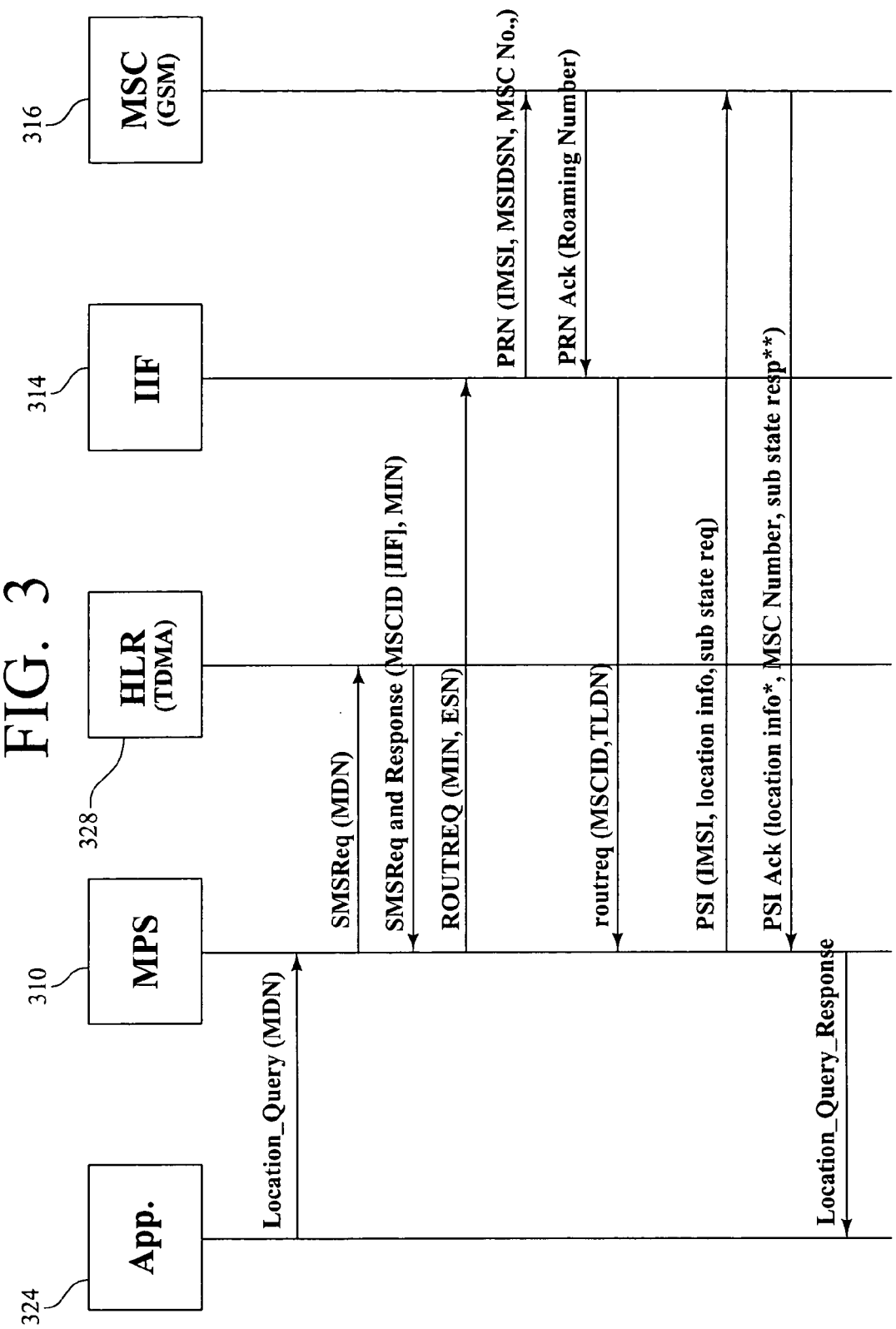
FIG. 3 is a message flow diagram depicting message generation and propagation steps for an exemplary embodiment of the invention in which a TDMA native wireless device is operating in a GSM environment, where the wireless device is in an idle mode.

FIG. 3 shows an exemplary embodiment in which an ANSI-136 (TDMA) native GAIT terminal is operating in a GSM environment, where the terminal is in an idle mode. The "Location_Query (MDN)" instruction from the application 324 to the MPS 310 initiates the request for the location of the GAIT terminal having the specified Mobile Directory Number (MDN). Next, the MPS 310 makes a TDMA format request to the HLR 328 for a Short Message (SMSReq) for the phone as a way of requesting the identity of the equipment serving the phone. The HLR 328 responds (SMSReq and Response (MSCID [IIF], MIN)) with the address of the IIF 314 in lieu of the actual Mobile Switching Center ID (MSCID), and the Mobile Identification Number (MIN) of the phone. Recognizing that the IIF address indicates that the phone is operating in a foreign technology mode, the MPS 310 makes a request for a temporary dialable number by requesting routing information (ROUTREQ (MIN, ESN)) from the IF 314 using the MIN and the Electronic Serial Number (ESN) of the phone, as if a call had come in to the native technology serving equipment and needed to be rerouted to the foreign technology serving equipment. The IIF 314 translates the request into a GSM protocol request to Provide Routing Number (PRN (IMSI, MSISDN, MSC No.)) to the foreign technology serving equipment (GSM MSC) 316, which responds with a temporary dialable number (PRN Ack (Roaming Number)). The IIF 314 then returns the temporary dialable number to the MPS 310 in ANSI-136 protocol (routreq (MSCID, TLDN)) as a Temporary Location Directory Number (TLDN). The MPS 310 is then able to cross-reference the temporary dialable number with the identity of the GSM MSC 316 by accessing the temporary dialable number database (not shown). With the identity of the GSM MSC 316, the MPS 310 can then request location information for the phone directly from the GSM MSC 316 with a Provide Subscriber Information (PSI (IMSI, location info, sub state req)) request in GSM protocol. The GSM MSC 316 then returns the desired location information with a Provide Subscriber Information Acknowledgment (PSI Ack (location info, MSC Number, sub state resp) in GSM protocol. Lastly, the MPS 310 returns the location information to the application 324 with Location_Query_Response in an IT protocol, or the like.

Figure 4:
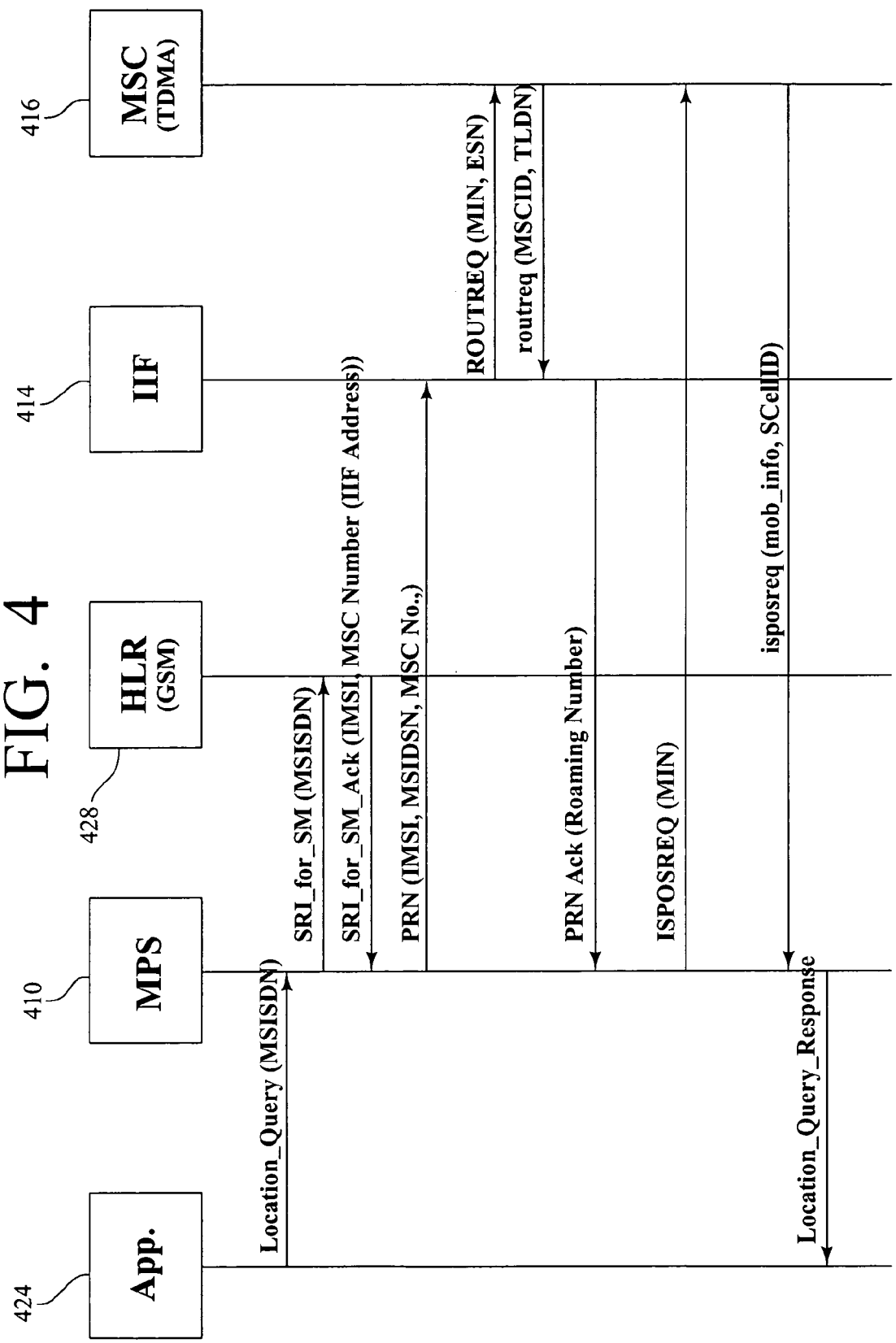
FIG. 4 is a message flow diagram depicting message generation and propagation steps for an exemplary embodiment of the invention in which a GSM native wireless device is operating in a TDMA environment, where the wireless device is in an idle mode.

FIG. 4 shows an exemplary embodiment in which a GSM native GAIT terminal is operating in an ANSI-136 environment, where the terminal is in an idle mode. The "Location_Query (MSISDN)" instruction from the application 424 to the MPS 410 initiates the request for the location of the GAIT terminal having the specified Mobile Station ISDN (MSISDN) number. Next, the MPS 410 makes a GSM format request to the HLR 428 for a Short Message (SRI_for_SM (MSISDN)) for the phone as a way of requesting the identity of the equipment serving the phone. The HLR 428 responds (SRI_for_SM_Ack (IMSI, MSC Number (IIF Address)) with the address of the IIF 414 in lieu of the actual Mobile Switching Center Number (MSC Number), and the IMSI of the phone. Recognizing that the IIF address indicates that the phone is operating in a foreign technology mode, the MPS 410 makes a request for a temporary dialable number by requesting Provide Routing Number (PRN (IMSI, MSISDN, MSC No.)) from the IIF 414 using the IMSI and the MSISDN of the phone, as if a call had come in to the native technology serving equipment and needed to be rerouted to the foreign technology serving equipment. The IIF 414 translates the request into a ANSI-136 protocol Route Request (ROUTREQ(MIN, ESN)) to the foreign technology serving equipment (TDMA MSC) 416, which responds with a temporary dialable number (routreq(MSCID, TLDN)). The IIF 414 then returns the temporary dialable number to the MPS 410 in GSM protocol (PRN Ack (Roaming Number)) as a Roaming Number. The MPS 410 is then able to cross-reference the temporary dialable number with the identity of the TDMA MSC 416 by accessing the temporary dialable number database (not shown). Having the identity of the TDMA MSC 416, the MPS 410 can then request location information for the phone directly from the TDMA MSC 416 with an IS Position Request (ISPOSREQ(MIN)) request in ANSI-136 protocol. The TDMA MSC 416 then returns the desired location information with a IS Position Request acknowledgment (isposreq(mob_info, SCellID) in ANSI-136 protocol. Lastly, the MPS 410 returns the location information to the application 424 with Location_Query_Response in an IT protocol, or the like.

Figure 5:
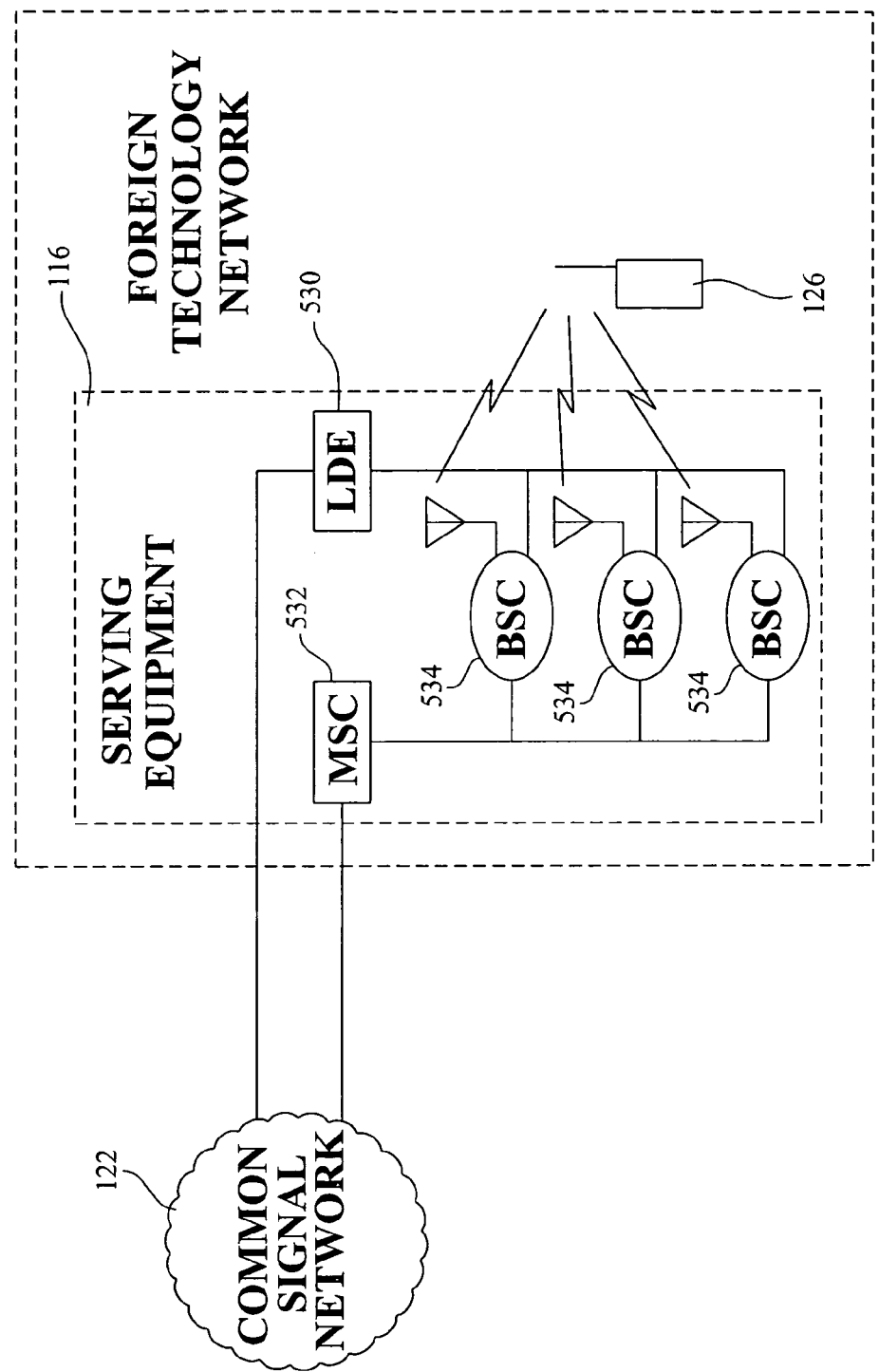
FIG. 5 is a block diagram of selected elements of the system of FIG. 1 also having Location Determining Entity Equipment (LDE) which is capable of more precisely determining the location of the wireless device by triangulation and other positioning technologies.

FIG. 5 shows an exemplary embodiment of the foreign technology serving equipment 116 of FIG. 1 also having location determining entity equipment (LDE) 530 which is capable of more precisely determining the location of the wireless device 126 by triangulation and other positioning technologies. Generally, the foreign technology serving equipment 116 consists of a Mobile Switching Center (MSC) 532 which may serve a number of Base Station Controllers (BSCs) 534. The MSC 532 and the LDE 530 are both connected to the common signaling network 122, but may also be connected directly to each other.

Figure 6:
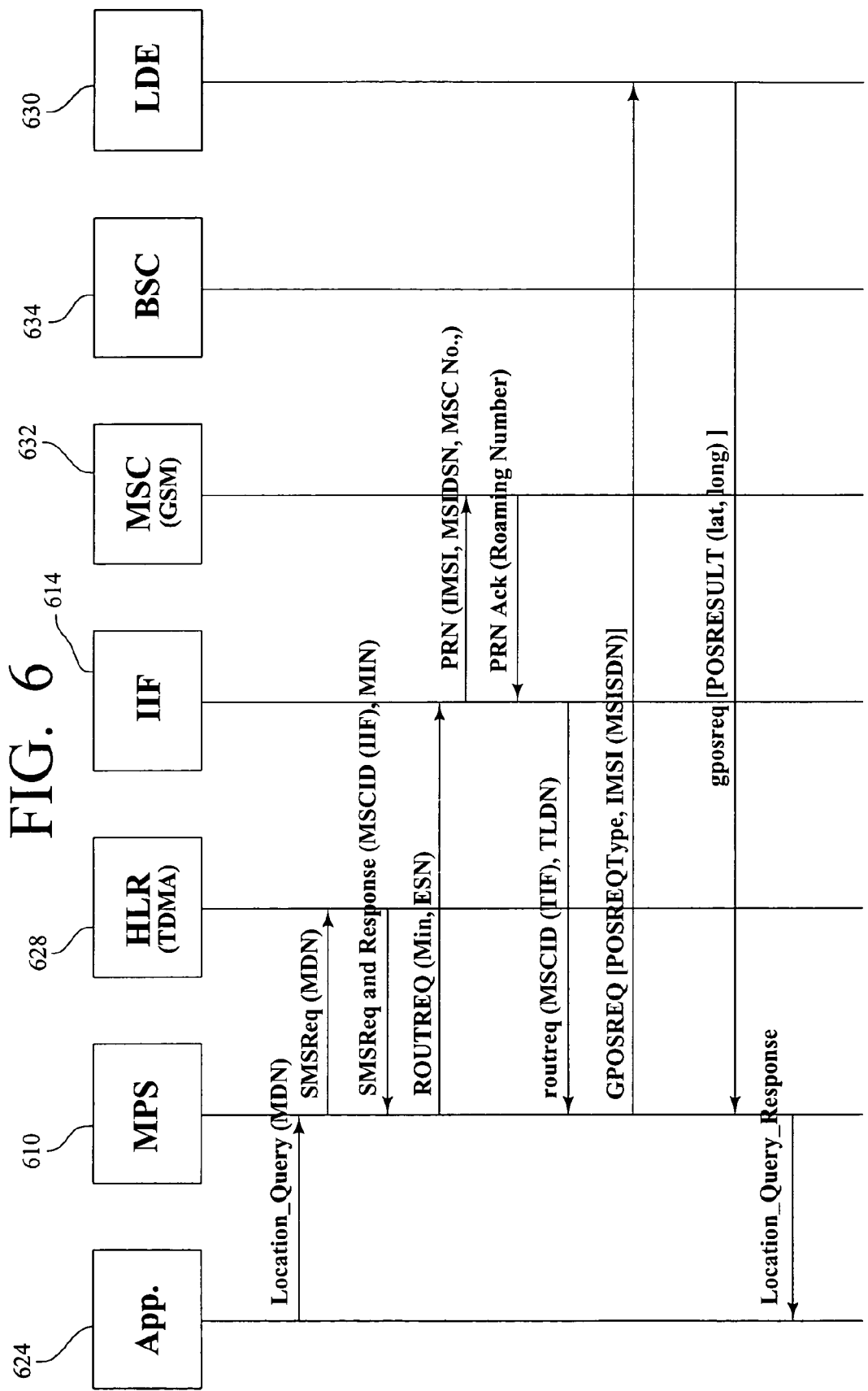
FIG. 6 is a message flow diagram depicting message generation and propagation steps for an exemplary embodiment of the invention in which a TDMA native wireless device is operating in a GSM environment, where the application has requested location information for the wireless device with a higher level of accuracy.

FIG. 6 shows an exemplary embodiment in which an ANSI-136 (TDMA) native GAIT terminal is operating in a GSM environment, where a higher level of accuracy has been requested by the application 624. The message flow proceeds as described in the embodiment of FIG. 3, with the exception that the MPS 610 formats an appropriate location request that utilizes the LDE 630 directly through the common signaling network 122. The LDE 630 then returns location information for the mobile phone with the desired level of accuracy.

Figure 7:
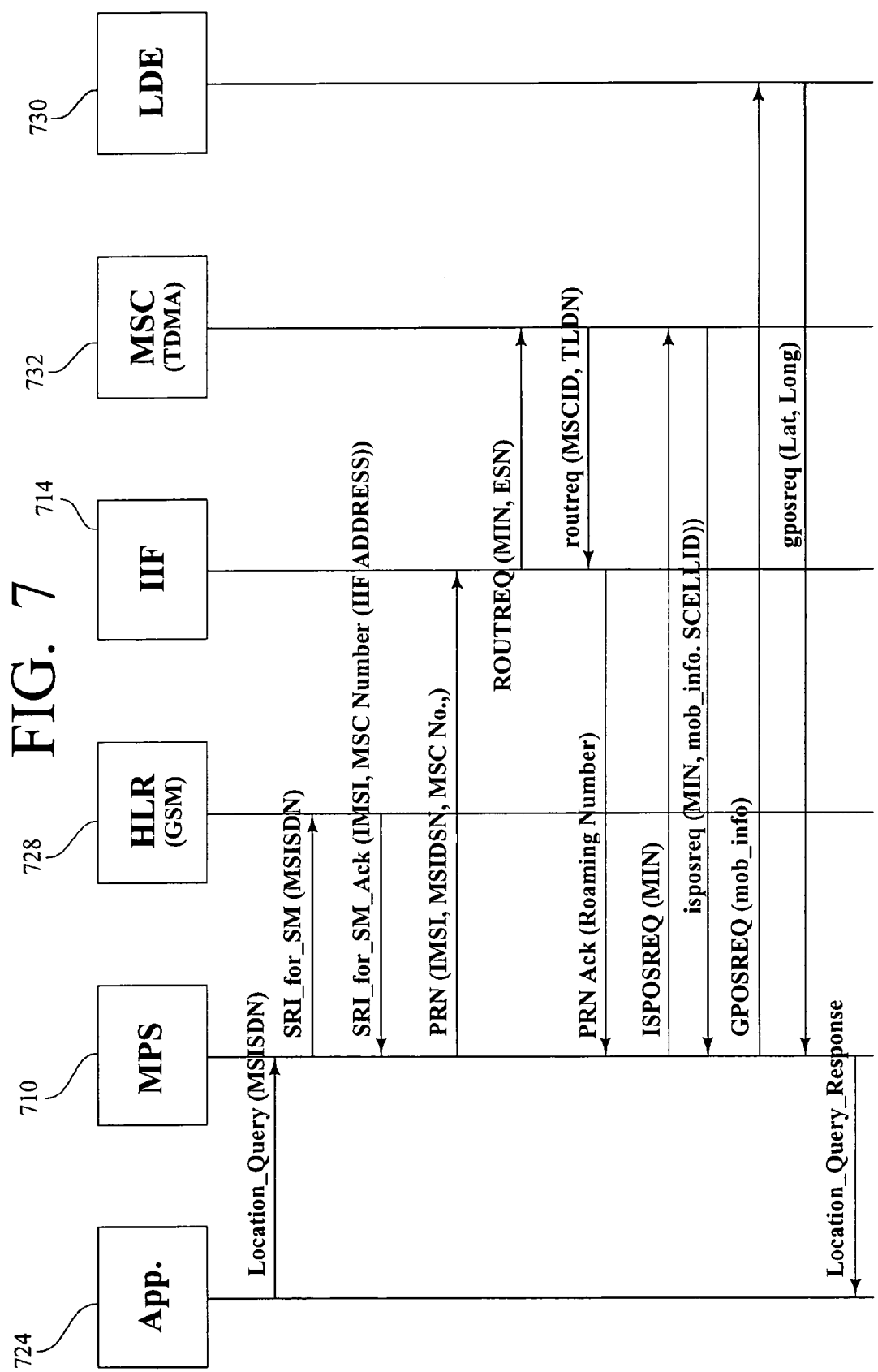
FIG. 7 is a message flow diagram depicting message generation and propagation steps for an exemplary embodiment of the invention in which a GSM native wireless device is operating in a TDMA environment, where the application has requested location information for the wireless device with a higher level of accuracy.

FIG. 7 shows an exemplary embodiment in which GSM native GAIT terminal is operating in a TDMA environment, where a higher level of accuracy has been requested by the application 724. The message flow proceeds as described in the embodiment of FIG. 4, with the exception that the MPS 710 formats an appropriate location request that utilizes the LDE 730 directly through the common signaling network 122. The LDE 730 then returns the location information for the mobile phone with the desired level of accuracy It should be noted that the principles described for the GAIT terminals and systems would also apply to other multi-technology systems, such as a GSM to CDMA type multi-technology system.

Thus, the invention provides a system and method for determining the location of a multi-technology wireless device operating in a foreign technology mode, among other benefits and features.

One of skill in the art will recognize that additional configurations are possible without departing from the teachings of the invention or the scope of the claims which follow.

This detailed description, and particularly the specific details of the exemplary embodiments disclosed, is given primarily for clearness of understanding and no unnecessary limitations are to be understood therefrom, for modifications will become obvious to those skilled in the art upon reading this disclosure and may be made without departing from the spirit or scope of the claimed invention.

What is claimed is:

1. A method for determining a location of a multi-technology wireless device operating in a foreign technology mode, said method comprising the steps of:

requesting an identity of equipment serving said multi-technology wireless device from a native technology serving equipment subscriber information database for said multi-technology wireless device;

receiving a response from said subscriber information database and determining that the subscriber information database has provided the identity of a network conversion element instead of the identity of actual serving equipment; and in response to the subscriber information database providing the identity of a network conversion element instead of the identity of actual serving equipment, requesting a temporary dialable number for said multi-technology device from said network conversion element;

determining an the identity of the equipment serving said multi-technology wireless device using said temporary dialable number; and obtaining the location of said multi-technology wireless device directly from said serving equipment.

2. The method of claim 1, wherein said step of determining the identity of said serving equipment comprises:

providing a temporary dialable number database which contains the identity of equipment associated with temporary dialable numbers; and utilizing said temporary dialable number database to cross reference said temporary dialable number with the identity of the equipment serving said temporary dialable number.

3. The method of claim 2, wherein said step of obtaining the location of said multi-technology wireless device comprises:

determining a level of accuracy desired for determining the location of the multi-technology wireless device;

determining, in response to the identity of the equipment serving said multi-technology wireless device, a request format reflecting the level of accuracy and compatible with technology of said serving equipment;

formatting a request for a geographic location of said multi-technology wireless device which provides said desired accuracy and is compatible with the technology of said serving equipment;

sending said geographic location request directly to said serving equipment; and receiving location information commensurate with said desired accuracy from said serving equipment.

4. A method of determining the identity of equipment serving a multi-technology wireless device operating in a foreign technology mode, said method comprising:

requesting an identity of said serving equipment from a native technology serving equipment subscriber information database for said multi-technology wireless device;

receiving a response from said subscriber information database and determining that the subscriber information database has provided the identity of a network conversion element instead of the identity of actual serving equipment; and in response to the subscriber information database providing the identity of a network conversion element instead of the identity of actual serving equipment, requesting a temporary dialable number for said multi-technology device from said network conversion element;

providing a temporary dialable number database which contains the identity of equipment associated with temporary dialable numbers; and utilizing said temporary dialable number database to cross reference said temporary dialable number with the identity of the equipment serving said temporary dialable number.

5. A method of initiating location signaling to equipment serving a multi-technology wireless device operating in a foreign technology mode, said method comprising:

requesting an identity of said serving equipment from a native technology serving equipment subscriber information database for said multi-technology wireless device;

receiving a response from said subscriber information database and determining that the subscriber information database has provided the identity of a network conversion element instead of the identity of actual serving equipment; and in response to the subscriber information database providing the identity of a network conversion element instead of the identity of actual serving equipment, requesting a temporary dialable number for said multi-technology device from said network conversion element;

determining an identity of the equipment serving said multi-technology wireless device by utilizing said temporary dialable number;

formatting a request for a geographic location of said multi-technology wireless device compatible with the identity of said serving equipment; and sending said geographic location request directly to said serving equipment.

6. The method of claim 5 wherein said formatting step comprises:

determining the level of accuracy desired for said geographic location information;

determining, in response to the identity of the equipment serving said multi-technology wireless device, a request format reflecting the level of accuracy and compatible with technology of said serving equipment; and formatting said geographic location request such that it provides said accuracy desired for said location information and is compatible with the technology of said serving equipment.

7. A method of identifying a type of technology in which a multi-technology wireless device operating in a foreign technology mode is operating, said method comprising the steps of:

requesting the identity of said serving equipment from a native technology serving equipment subscriber information database for said multi-technology wireless device;

receiving a response from said subscriber information database and determining that the subscriber information database has provided the identity of a network conversion element instead of the identity of actual serving equipment;

in response to the subscriber information database providing the identity of a network conversion element instead of the identity of actual serving equipment, requesting a temporary dialable number for said multi-technology device from said network conversion element;

providing a temporary dialable number database which contains the type of technology of equipment associated with temporary dialable numbers; and utilizing said temporary dialable number database to cross reference said temporary dialable number with the type of technology of the equipment serving said temporary dialable number, which corresponds to the type of technology in which the multi-technology wireless device is operating.

8. A system for determining a location of a multi-technology wireless device operating in a foreign technology environment, said system comprising:

a database relating each temporary dialable number of a plurality of temporary dialable numbers to corresponding serving equipment serving said temporary dialable numbers;

a network conversion element operative to translate signaling from a native technology protocol to a foreign technology protocol for said multi-technology wireless device; and a subscriber information database operating in the native technology environment of said multi-technology wireless device, said subscriber information database containing the address of the network conversion element associated with said multi-technology wireless device operating in a foreign technology environment; and a mobile position server in communication with said temporary dialable number database, said mobile position server operative to:
- request and receive a temporary dialable number for said multi-technology wireless device;
- utilize said database to cross reference said temporary dialable number with an identity of the corresponding serving equipment; and
- obtain the location of said multi-technology wireless device directly from said corresponding serving equipment;

wherein said mobile position server is in communication with said network conversion element and said subscriber information database;

wherein said mobile position server is operative to determine that the subscriber information database contains the address of said network conversion element; and wherein said mobile position server obtains said temporary dialable number for said multi-technology wireless device from said network conversion element.

9. A system for determining a location of a multi-technology wireless device operating in a foreign technology environment, said system comprising:

a means for obtaining a temporary dialable number for said multi-technology wireless device comprising:

a means for requesting an identity of equipment serving said multi-technology wireless device from a native technology serving equipment subscriber information database for said multi-technology wireless device;

a means for receiving a response from said subscriber information database and determining that the subscriber information database has provided the identity of a network conversion element instead of the identity of actual serving equipment, wherein in response to the subscriber information database has provided providing the identity of a network conversion element instead of the identity of actual serving equipment, a temporary dialable number is requested for said multi-technology device from said network conversion element;

a means for determining an identity of equipment serving said multi-technology wireless device by utilizing said temporary dialable number; and a means for determining the location of said multi-technology wireless device directly from said serving equipment.

10. The system of claim 9, wherein said means for determining the identity of the serving equipment further comprises:

a means for relating temporary dialable numbers for roaming devices in a wireless network with the corresponding equipment serving said temporary dialable numbers; and a means for utilizing said means for relating to cross reference said temporary dialable number with the identity of said serving equipment.

11. A computer readable medium encoded with computer executable instructions for performing a method for determining a location of a multi-technology wireless device operating in a foreign technology mode, comprising:

requesting an identity of equipment serving said multi-technology wireless device from a native technology serving equipment subscriber information database for said multi-technology wireless device;

receiving a response from said subscriber information database and determining that the subscriber information database has provided the identity of a network conversion element instead of the identity of actual serving equipment; and in response to the subscriber information database providing the identity of a network conversion element instead of the identity of actual serving equipment, requesting a temporary dialable number for said multi-technology device from said network conversion element;

determining the identity of the equipment serving said multi-technology wireless device by utilizing said temporary dialable number; and obtaining the location of said multi-technology wireless device directly from said serving equipment.

12. A computer readable medium encoded with computer executable instructions for performing a method of determining an identity of equipment serving a multi-technology wireless device operating in a foreign technology mode, comprising:

requesting an identity of equipment serving said multi-technology wireless device from a native technology serving equipment subscriber information database for said multi-technology wireless device;

receiving a response from said subscriber information database and determining that the subscriber information database has provided the identity of a network conversion element instead of the identity of actual serving equipment; and in response to the subscriber information database providing the identity of a network conversion element instead of the identity of actual serving equipment, requesting a temporary dialable number for said multi-technology device from said network conversion element;

providing a database which contains the identity of equipment associated with temporary dialable numbers; and utilizing said database to cross reference said temporary dialable number with the identity of the equipment serving said temporary dialable number.

13. A computer readable medium encoded with computer executable instructions for performing a method of initiating location signaling to equipment serving a multi-technology wireless device operating in a foreign technology mode comprising:

requesting an identity of equipment serving said multi-technology wireless device from a native technology serving equipment subscriber information database for said multi-technology wireless device;

receiving a response from said subscriber information database and determining that the subscriber information database has provided the identity of a network conversion element instead of the identity of actual serving equipment; and in response to the subscriber information database providing the identity of a network conversion element instead of the identity of actual serving equipment, requesting and receiving a temporary dialable number for said multi-technology device from said network conversion element;

determining an identity of the equipment serving said multi-technology wireless device by utilizing said temporary dialable number;

formatting a request for a geographic location of said multi-technology wireless device compatible with the identity of said serving equipment; and sending said geographic location request directly to said serving equipment.

14. A computer readable medium encoded with computer executable instructions for performing a method of identifying a type of technology in which a multi-technology wireless device operating in a foreign technology mode is operating comprising:

requesting an identity of equipment serving said multi-technology wireless device from a native technology serving equipment subscriber information database for said multi-technology wireless device;

receiving a response from said subscriber information database and determining that the subscriber information database has provided the identity of a network conversion element instead of the identity of actual serving equipment; and in response to the subscriber information database providing the identity of a network conversion element instead of the identity of actual serving equipment, requesting and receiving a temporary dialable number for said multi-technology device from said network conversion element;

providing a data source which relates the type of technology of equipment associated with each temporary dialable number of a plurality of temporary dialable numbers; and utilizing said data source to cross reference said temporary dialable number with the type of technology of the equipment serving said temporary dialable number, which corresponds to the type of technology in which the multi-technology wireless device is operating.

* * * * *